(12) United States Patent
Ehrnberg

(10) Patent No.: US 10,662,926 B2
(45) Date of Patent: May 26, 2020

(54) FLOATING WIND ENERGY HARVESTING APPARATUS WITH BRAKING ARRANGEMENT, AND A METHOD OF CONTROLLING A ROTATIONAL SPEED OF THE APPARATUS

(71) Applicant: SeaTwirl AB, Göteborg (SE)

(72) Inventor: Daniel Ehrnberg, Steninge (SE)

(73) Assignee: SEATWIRL AB, Göteborg (SE)

( * ) Notice: Subject to any disclaimer, the term of this patent is extended or adjusted under 35 U.S.C. 154(b) by 143 days.

(21) Appl. No.: 15/759,307

(22) PCT Filed: Sep. 13, 2016

(86) PCT No.: PCT/SE2016/050851
§ 371 (c)(1),
(2) Date: Mar. 12, 2018

(87) PCT Pub. No.: WO2017/052446
PCT Pub. Date: Mar. 30, 2017

(65) Prior Publication Data
US 2018/0252203 A1  Sep. 6, 2018

(30) Foreign Application Priority Data
Sep. 23, 2015 (SE) .................................. 1551219

(51) Int. Cl.
*F03D 7/06* (2006.01)
*F03D 13/25* (2016.01)
(Continued)

(52) U.S. Cl.
CPC ............. *F03D 7/06* (2013.01); *B63B 35/44* (2013.01); *F03D 7/0244* (2013.01); *F03D 13/25* (2016.05);
(Continued)

(58) Field of Classification Search
CPC ..................... F03D 7/0244; F05B 2270/1011
See application file for complete search history.

(56) References Cited

U.S. PATENT DOCUMENTS 7,397,144 B1 * 7/2008 Brostmeyer ............ F03B 13/20
290/53
9,879,649 B2 * 1/2018 Inoue ..................... F03B 17/06
(Continued)

FOREIGN PATENT DOCUMENTS

| EP | 2 080 899 | 7/2009 |
|---|---|---|
| EP | 2 716 908 | 9/2014 |

(Continued)

OTHER PUBLICATIONS

Notification of Transmittal of the International Search Report and the Written Opinion of the International Searching Authority from PCT/SE2016/050851, dated Dec. 9, 2016.
(Continued)

*Primary Examiner* — Christopher Verdier
*Assistant Examiner* — Jason A Fountain
(74) *Attorney, Agent, or Firm* — Westman, Champlin & Koehler, P.A.

(57) ABSTRACT

The present invention relates to a floating wind energy harvesting apparatus for offshore installation, comprising an elongated wind turbine body extending along a longitudinal wind turbine body axis; at least one blade attached to the wind turbine body for converting wind energy to rotation of the wind turbine body around the longitudinal wind turbine body axis; an energy converter coupled to the wind turbine body for converting the rotation of the wind turbine body to electrical energy; and a braking arrangement for controllably reducing a rotational speed of the wind turbine body. The braking arrangement comprises an inlet; an outlet; a water transporting arrangement coupled to the wind turbine body to transport water from the inlet to the outlet in response to
(Continued)

rotation of the wind turbine body; and an access control arrangement for controllably preventing water from passing through the water transporting arrangement.

14 Claims, 4 Drawing Sheets

(51) Int. Cl.
  *F03D 80/00* (2016.01)
  *F03D 7/02* (2006.01)
  *B63B 35/44* (2006.01)
(52) U.S. Cl.
  CPC ........ *F03D 80/00* (2016.05); *B63B 2035/446* (2013.01); *F05B 2220/706* (2013.01); *F05B 2240/214* (2013.01); *F05B 2240/93* (2013.01); *F05B 2240/95* (2013.01); *F05B 2240/97* (2013.01); *F05B 2260/904* (2013.01); *F05B 2270/1011* (2013.01); *Y02E 10/723* (2013.01); *Y02E 10/725* (2013.01); *Y02E 10/727* (2013.01)

(56) References Cited

U.S. PATENT DOCUMENTS

| 10,047,723 B2 * | 8/2018 | Akimoto | F03B 17/06 |
| 2013/0272846 A1 * | 10/2013 | Inoue | F03B 17/06 415/3.1 |

FOREIGN PATENT DOCUMENTS

| KR | 10-1338122 | 12/2013 |
| NL | 1035026 | 8/2009 |
| WO | WO 2011/008153 | 1/2011 |

OTHER PUBLICATIONS

Office Action from Swedish Patent Application No. 1551219-7, dated Nov. 23, 2018, 4 pgs.
The Conceptual Design of a Safety System: For the 5MW Deepwind Offshore Floating Vertical-Axis Wind Turbine, by N. Chrysochoidis-Antsos, Apr. 2014, 115 pgs.

\* cited by examiner

FLOATING WIND ENERGY HARVESTING APPARATUS WITH BRAKING ARRANGEMENT, AND A METHOD OF CONTROLLING A ROTATIONAL SPEED OF THE APPARATUS

CROSS-REFERENCE TO RELATED APPLICATION

This Application is a Section 371 National Stage Application of International Application No. PCT/SE2016/050851, filed Sep. 13, 2016 and published as WO 2017/052446 on Mar. 30, 2017, in English, which claims priority to Swedish Patent Application No. 1551219-7, filed on Sep. 23, 2015, the contents of which are hereby incorporated by reference in their entirety.

FIELD OF THE INVENTION

The present invention relates to a floating wind energy harvesting apparatus for offshore installation, and to a method of controlling a rotational speed of a floating wind energy harvesting apparatus.

BACKGROUND OF THE INVENTION

Wind energy has long been known to be a clean and safe form of energy. Recently, the use of wind turbines for generating electricity has increased. Most of the generated electricity comes from land-based wind turbines.

However, it is sometimes difficult to find good locations on land for new wind turbines, and it is known that the wind at sea is stronger and more consistent than the wind over land. On the other hand, offshore wind turbines have to be able to withstand considerably harsher conditions and have so far been found to be more difficult and costly to install and to access for maintenance.

Therefore, much effort has been spent on developing wind turbines suitable for offshore use.

Since the establishment of reliable and cost-efficient wind turbine foundations in offshore locations in particular has been found to be a major challenge, one approach has been to develop floating wind turbines for offshore use.

A particularly interesting development is floating vertical axis wind turbines (VAWTs), in which the floating turbine body of the VAWT rotates in the water, effectively using the water as a kind of bearing.

This approach, which practically obviates the need for the above-mentioned costly and complicated building of wind turbine foundations and provides for a robust and relatively cost-efficient construction, is described in WO 2011/008153 and NL 1035026.

To prevent damage to the wind turbine in, for example, high wind conditions, it is necessary to provide means for controllably reducing the rotational speed of the wind turbine. It would be desirable to provide for such means that are cost-efficient, reliable and safe.

SUMMARY

In view of the above-mentioned and other drawbacks of the prior art, it is an object of the present invention to provide an improved floating wind energy harvesting apparatus, and in particular to provide for cost-efficient and reliable controllable reduction of the rotational speed of a floating wind energy harvesting apparatus.

According to a first aspect of the present invention, it is therefore provided a floating wind energy harvesting apparatus for offshore installation, the wind energy harvesting apparatus comprising: an elongated wind turbine body extending along a longitudinal wind turbine body axis; at least one blade attached to the wind turbine body for converting wind energy to rotation of the wind turbine body around the longitudinal wind turbine body axis; an energy converter coupled to the wind turbine body for converting the rotation of the wind turbine body to electrical energy; and a braking arrangement for controllably reducing a rotational speed of the wind turbine body, the braking arrangement comprising: an inlet; an outlet; a water transporting arrangement coupled to the wind turbine body to transport water from the inlet to the outlet in response to rotation of the wind turbine body; and an access control arrangement controllable to prevent water from passing through the water transporting arrangement.

It should be understood that the wind turbine body may comprise a plurality of wind turbine body portions, which may perform different functions. For instance, the wind turbine body may comprise a buoyancy-providing portion and a ballast portion (a weight) for keeping the wind energy harvesting apparatus floating generally upright, with the longitudinal wind turbine body axis thus being generally vertical. Naturally, the action of wind and/or waves may typically cause the orientation of the longitudinal wind turbine body axis to fluctuate, and to deviate from the vertical direction.

Regarding the above-mentioned buoyancy-providing portion and ballast portion, these portions may advantageously be spaced apart as far as possible, to separate the center of buoyancy and center of mass. This arrangement provides for stable operation of the wind energy harvesting apparatus.

When the floating wind energy harvesting apparatus is in use, it will be floating in a body of water, and the wind turbine body and the at least one blade will rotate in relation to the water in which the apparatus is floating. In other words, the water in which the floating wind energy harvesting apparatus is floating will be stationary in relation to the wind turbine body which is in contact with the water (except possibly for a region directly adjacent to the surface of the wind turbine body).

It would be desirable to make offshore wind turbines very large. Floating VAWTs can be made considerably larger, and thus capable of supplying considerably more power, than offshore wind turbines with a fixed foundation or floating horizontal axis wind turbines (HAWTs).

However, as was also explained in the Background section, it will be necessary to provide means for slowing down the rotation of the wind turbine, in particular in high wind conditions. A straight-forward solution would be to equip a large floating VAWT with a scaled up mechanical brake, such as a disc brake with one or several calipers. However, the cost of such a mechanical brake capable of reducing the rotational speed of the VAWT in high wind conditions would be very high. Furthermore, heat generation and reliability under harsh conditions at sea are difficult issues. In addition, the requirements on the anchoring of the wind turbine would be severe.

The present invention is based upon the realization that a reliable and relatively inexpensive way of reducing the rotational speed of a floating vertical axis wind turbine (VAWT) would be to controllably use the rotation of the wind turbine to move water in which the turbine is floating. As kinetic energy of the wind turbine is then converted to kinetic and possibly potential energy of moved water, the rotation can be slowed down without the need for a mechanical brake with the capacity of dissipating a large amount of energy.

The present inventor has further realized that a water movement based braking arrangement can be controlled by providing a water transporting arrangement and controlling access of water to the water transporting arrangement. When water is not allowed to pass through the water transporting arrangement, the braking arrangement is disengaged and does not brake the VAWT. When water is allowed to pass through the water transporting arrangement, part of the energy of the rotation of the VAWT is used to accelerate and transport water, so that the rotation is slowed down.

Furthermore, since water is always available for a wind turbine floating in a body of water, and the above-mentioned control of the access of water can readily be made dependent on the supply of electrical energy from the wind turbine, embodiments of the present invention provide for fail safe braking, that can automatically reduce the rotational speed of the wind turbine in the case of malfunction of the wind turbine.

According to various embodiments, the water transporting arrangement may advantageously comprise a first water transporting part coupled to the wind turbine body for rotating in response to rotation of the wind turbine body; and a second water transporting part to be kept relatively stationary in relation to the wind turbine body. The second water transporting part may be arranged to form a water transport path from the inlet to the outlet between the wind turbine body and the second water transporting part; and the first water transporting part may comprise a water moving member for moving water that is in contact with the water moving member through the water transport path when the first water transporting part rotates in relation to the second water transporting part.

The first water transporting part may be formed by a separate part (or separate parts) that is coupled to the wind turbine body in such a way that it (or they) rotates in response to rotation of the wind turbine body.

Advantageously, however, the first water transporting part may be constituted by a portion of the wind turbine body. Such embodiments provide for a simple and reliable construction with few moving parts.

The water transport path may be embodied as a space between the wind turbine body and the second water transporting part.

In embodiments, the second water transporting part may be arranged concentrically around said wind turbine body. For instance, the second water transporting part may be provided as a concentric shell surrounding the wind turbine body along a portion of the length of the wind turbine body.

In various embodiments, furthermore, the above-mentioned water moving member may be constituted by at least one blade for pushing water along the water transport path.

To improve the efficiency of the water transport, and to direct the transport of water from the inlet towards the outlet, the second water transporting part may advantageously comprise at least one water redirecting member for co-operating with the water moving member comprised in the first water transporting part.

According to various embodiments, furthermore, the access control arrangement may be controllable to prevent water from reaching the water transporting arrangement through the inlet.

In these embodiments, the water transporting arrangement can operate without water present when the braking arrangement is not engaged. This provides for less unwanted energy dissipation through viscous friction than when the water transporting arrangement operates on water without a net transport of water, as may be the case if the inlet is left open and the outlet is controllably blocked to prevent water from passing through the water transporting arrangement.

According to various embodiments, furthermore, the outlet may be configured to direct transported water flowing out through the outlet towards the direction of rotation of the wind turbine body. In this manner, the flow of water will assist in retarding the rotation of the wind turbine body through reaction force caused by the jet of water exiting the outlet.

Moreover, the access control arrangement may advantageously comprise a gas supply arrangement for providing pressurized gas to a space formed between the inlet and the outlet. With sufficient pressure inside the space between the inlet and the outlet, the pressurized gas can prevent water from reaching the water transporting arrangement through the inlet. If the gas pressure is lost for some reason, water will be allowed to reach the water transport arrangement through the inlet. As a result, when the wind turbine body is rotating, water will be transported by the water transport arrangement, which will in turn slow the rotation of the wind turbine body as described above.

The above-mentioned gas supply arrangement may advantageously comprise a compressor which may be powered by the energy converter comprised in the floating wind energy harvesting apparatus. In the case of malfunction of the energy converter or of the compressor, the pressure of gas (typically air) in the space between the inlet and the outlet would gradually decrease through leakage of gas. If the inlet is arranged below the water surface, water would then flow into the water transporting arrangement, resulting in a slowing down of the rotation of the wind turbine. Alternatively, or in combination, the gas supply arrangement may comprise control circuitry for automatically stopping gas supply in response to control signals indicating extreme conditions or a system malfunction. For instance, the wind energy harvesting apparatus may comprise a wind meter, and a control signal from the wind meter indicating extreme winds may cause the gas supply to stop.

To provide for the necessary pressure at the inlet of the braking arrangement, the access control arrangement may further comprise a sealing arrangement for restricting a flow of the gas through the outlet.

The sealing arrangement may be arranged and configured to restrict flow of gas through the outlet so that, for example, a compressor is easily able to maintain pressure at the inlet. At the same time, the sealing arrangement may be arranged and configured to be opened up by the considerably larger pressure exerted on the sealing arrangement by the water transported from the inlet to the outlet by the water transporting arrangement.

To that end, the sealing arrangement may for example be spring-loaded to substantially close the outlet up to a certain force acting on the sealing arrangement, and to open the outlet when a greater force acts on the sealing arrangement.

In order to maintain a suitable pressure at the inlet, the floating wind energy harvesting apparatus may further comprise a pressure sensor arranged to sense a pressure in the water transport path between the inlet and the outlet, and a controller connected to the pressure sensor and to the gas supply arrangement for controlling the gas supply arrangement in response to a signal provided by the pressure sensor.

Alternatively or in combination, the access control arrangement may comprise a reservoir in a lower wind turbine body portion, and at least one controllable hatch to allow water to flood into the reservoir. In these embodiments, the floating wind energy harvesting apparatus may be dimensioned in such a way that the inlet of the braking arrangement (or at least the water moving member(s) of the first water transporting part) is above the surface of the body of water when the above-mentioned reservoir is filled with air, and below the surface of the body of water when the reservoir is filled with water. The braking arrangement can then be engaged by opening the at least one hatch and sinking the wind turbine body sufficiently to bring the water moving member(s) of the first water transporting part into the body of water.

To provide for fail safe operation, the at least one hatch may open inwards, towards the interior of the reservoir, and be kept closed by an actuator powered by electricity from the energy converter. Alternatively, or in combination, the actuator for keeping the at least one hatch closed may be controlled by control circuitry for automatically cutting power to the actuator in response to control signals indicating extreme conditions or a system malfunction. For instance, the wind energy harvesting apparatus may comprise a wind meter, and a control signal from the wind meter indicating extreme winds may cause the gas supply to stop.

Moreover, the access control arrangement may comprise an evacuation device for emptying the reservoir to again move the inlet/water moving member(s) above the water surface. The evacuation device may, for example, be a pump or a compressor.

According to an advantageous embodiment of the floating wind energy harvesting apparatus of the present invention, the water transporting arrangement may comprise: a first water transporting part formed by a portion of the wind turbine body and a plurality of water moving blades attached to the wind turbine body; and a second water transporting part formed by a concentrically arranged shell surrounding the first water transporting part to form a water transport path between the inlet at a lower opening between the first water transporting part and the second water transporting part and the outlet at an upper opening between the first water transporting part and the second water transporting part; and the access control arrangement may comprise: a compressor powered by the energy converter for providing pressurized air into the water transport path; and a sealing arrangement arranged to restrict flow of the air through the outlet, thereby allowing the pressurized air to prevent water from reaching the water moving blades.

The compressor may advantageously be attached to the second water transporting part.

In addition to the braking arrangement using conversion of rotation to transport of water for reducing the rotational speed of the wind turbine, the floating wind energy harvesting apparatus according to embodiments of the present invention may additionally comprise a mechanical brake for further reducing the rotational speed of the wind turbine after having engaged the water movement braking arrangement.

Such a mechanical brake need not be dimensioned for high rotational speeds and can be relatively compact and inexpensive.

According to various embodiments, furthermore, the wind turbine body may comprise a lower body portion to be below a water surface when the wind energy harvesting apparatus is in operation and an upper body portion to be above the water surface when the wind energy harvesting apparatus is in operation; and the energy converter may comprise a first energy converter part coupled to the turbine body for rotating in response to rotation of the wind turbine body, and a second energy converter part to be kept relatively stationary in relation to the wind turbine body, the resulting rotation of the first energy converter part in relation to the second energy converter part being converted to electrical energy by the energy converter, wherein the energy converter may be attached to the wind turbine body by means of a first releasable mechanical coupling between the first energy converter part and the lower body portion of the wind turbine body, and a second releasable mechanical coupling between the first energy converter part and the upper body portion of the wind turbine body.

These embodiments provide for simpler and safer maintenance of the floating wind energy harvesting apparatus, in particular when the wind energy harvesting apparatus is very large.

The energy converter may advantageously be a generator/motor.

Moreover, one of the first energy converter part and the second energy converter part may comprise at least one magnet, and the other one of the first and second energy converter parts may comprise at least one coil, so that rotation of the first energy converter part in relation to the second energy converter part results in the conductor of the at least one coil moving through the magnetic field generated by the at least one magnet.

Advantageously, the first energy converter part may comprise the at least one magnet, and the second energy converter part may comprise the at least one coil, to facilitate conduction of electrical current from and to the energy converter. Alternatively, one or several generator/motors may be comprised in one of the first energy converter part and the second energy converter part, and may be driven (when in generator mode) by the relative rotation between the first and second energy converter parts. For example, one or several generator/motors may be attached to the second energy converter part and driven (when in generator mode) by a pinion on the first energy converter part.

An arm may be connected to the second energy converter part to allow mechanical coupling of the second energy converter part to an anchoring arrangement or a braking arrangement, in order to achieve the desired relative rotation between the first energy converter part and the second energy converter part.

The above-mentioned electrical current may be conducted from or to the energy converter in a conductor, which may extend along the above-mentioned arm.

Furthermore, the energy converter may comprise a control unit for controlling operation of the wind energy harvesting apparatus. For instance, the control unit may be configured to control the energy converter to alternate between functioning as a generator and functioning as a motor.

According to a second aspect of the present invention, there is provided a method of controlling a rotational speed of a wind energy harvesting apparatus floating in a body of water, the wind energy harvesting apparatus comprising: an elongated wind turbine body extending along a longitudinal wind turbine body axis to be partly below a surface of the body of water; at least one blade attached to the wind turbine body for converting wind energy to rotation of the wind turbine body around the longitudinal wind turbine body axis; and an energy converter coupled to the wind turbine body for converting the rotation of the wind turbine body to electrical energy, wherein the method comprises the steps of: providing, below the surface of the body of water, a water moving member coupled to the wind turbine body for moving water that is in contact with the water moving member in response to rotation of the wind turbine body; and controlling access of water from the body of water to the water moving member.

According to embodiments, the step of controlling access may comprise the steps of: supplying compressed air to a water transport path to prevent water from the body of water from reaching the water moving member; acquiring a signal indicating that a reduced rotational speed of the wind turbine body is desired; and reducing the supply of compressed air to the water transport path to thereby allow water from the body of water to reach the water moving member.

For fail safe operation, the access of water from the body of water to the water moving member may advantageously be controlled using an access control arrangement requiring energy from the energy converter to prevent the access of water.

Further embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

Figure 1:
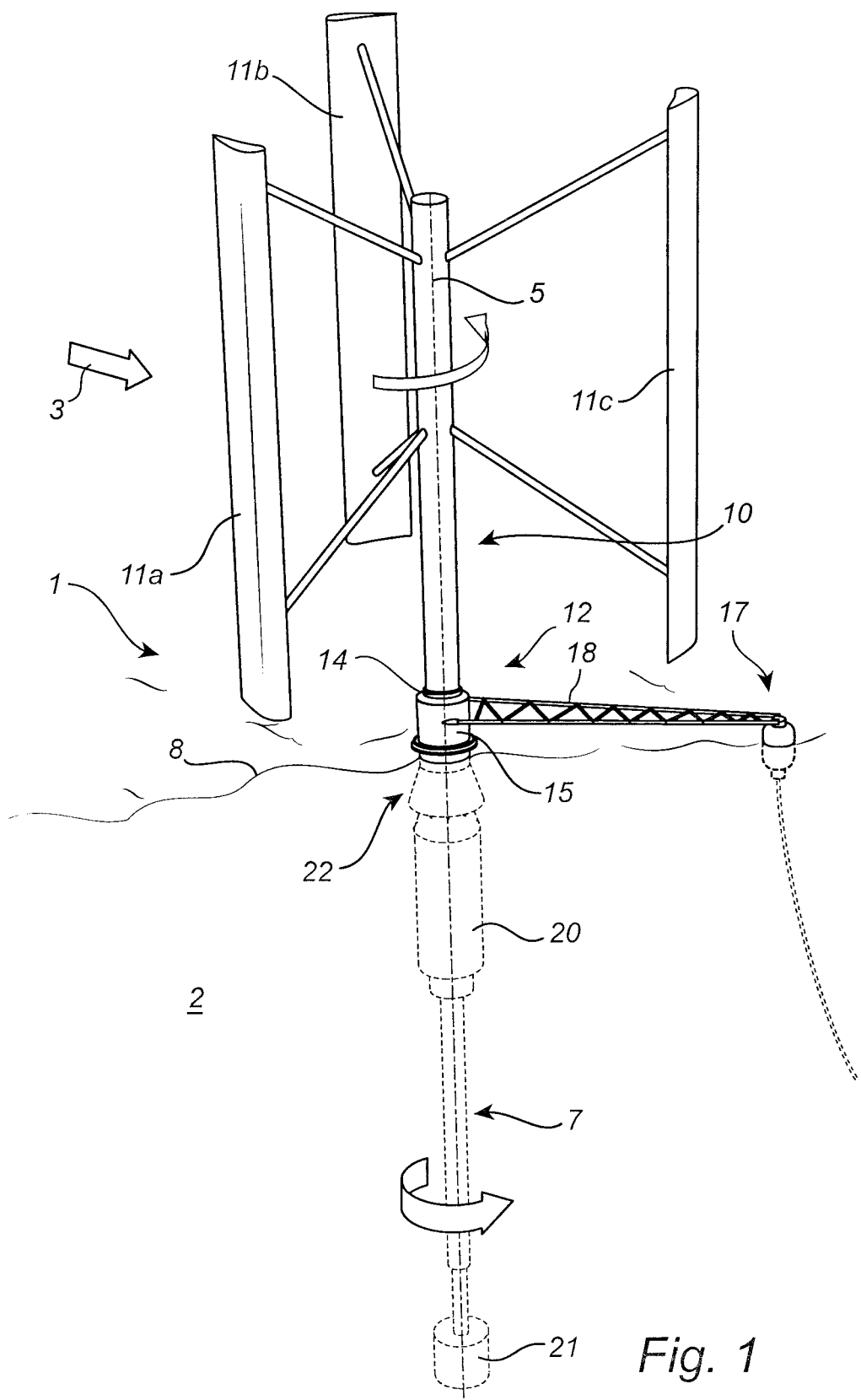
FIG. 1 is a schematic perspective view of a floating wind energy harvesting apparatus according to an example embodiment of the present invention.

FIG. 1 schematically illustrates a floating wind energy harvesting apparatus in the form of a floating vertical axis wind turbine (VAWT) 1. In FIG. 1, the VAWT 1 is shown floating in a body of water (the sea) 2 and being exposed to wind 3.

Referring to FIG. 1, the VAWT 1 comprises an elongated wind turbine body extending along a longitudinal wind turbine body axis 5. As is schematically indicated in FIG. 1, the wind turbine body comprises a lower body portion 7 mainly arranged below the water surface 8, and an upper body portion 10 mainly arranged above the water surface 8. The VAWT 1 further comprises blades 11a-c attached to the upper body portion 10, and an energy converter 12 attached to the wind turbine body between the lower body portion 7 and the upper body portion 10.

As will be described below in further detail, the energy converter 12 comprises a first energy converter part 14 and a second energy converter part 15. The first energy converter part 14 is releasably mechanically coupled to the lower body portion 7 and the upper body portion 10 to rotate around the longitudinal wind turbine body axis 5 together with the lower 7 and upper 10 body portions. The second energy converter part 15 is coupled to an anchoring arrangement 17 via arm 18 to keep the second energy converter part 15 relatively stationary in relation to the first energy converter part 14.

As is schematically shown in FIG. 1, the lower body portion 7 comprises a buoyancy-providing portion 20 and a ballast portion 21 that are dimensioned to keep the VAWT 1 generally vertical and the energy converter 12 above the water surface 8.

The buoyancy-providing portion 20 may comprise a foam-filled space, making the VAWT 1 unsinkable, and a reservoir (not shown) for allowing control of the buoyancy of the VAWT 1. The reservoir may be controllably filled with water to control the level of the VAWT 1 to compensate for factors such as variations in the salt concentration in the water and organic growth on the lower body portion 7.

When the wind 3 blows as is schematically indicated in FIG. 1, the forces resulting from the interaction between the wind and the blades 11a-c cause the wind turbine body to rotate around the longitudinal axis 5. This in turn results in rotation of the first energy converter part 14 in relation to the second energy converter part 15. This relative rotation is converted to electrical energy.

Most parts of the VAWT 1 in FIG. 1 may be robust and can be made from relatively cheap and sturdy materials, such as steel and concrete, and will not be moving when in contact with anything but air or water. Therefore, most parts of the VAWT 1 are likely to be operational during the entire lifetime of the VAWT 1. However, the energy converter 12 may need maintenance or replacement at least at some time during the lifetime of the VAWT 1.

To facilitate maintenance or replacement of the energy converter 12, the first energy converter part 14 is, as was described above, releasably mechanically connected between the lower body portion 7 and the upper body portion 10.

In addition, the VAWT 1 comprises a braking arrangement 22 providing for controllable reduction in the rotational speed of the VAWT 1. This may, for instance, be necessary in high wind conditions or in the case of component malfunction. For example, if the energy converter 12 stops working, it may be necessary to stop the VAWT 1, both to prevent further damage to the VAWT 1 and to allow safe access to the VAWT 1 for maintenance or replacement of the energy converter 12.

An example of the configuration of the braking arrangement 22 will now be described with reference to FIGS. 2a-b.

Figure 2A:
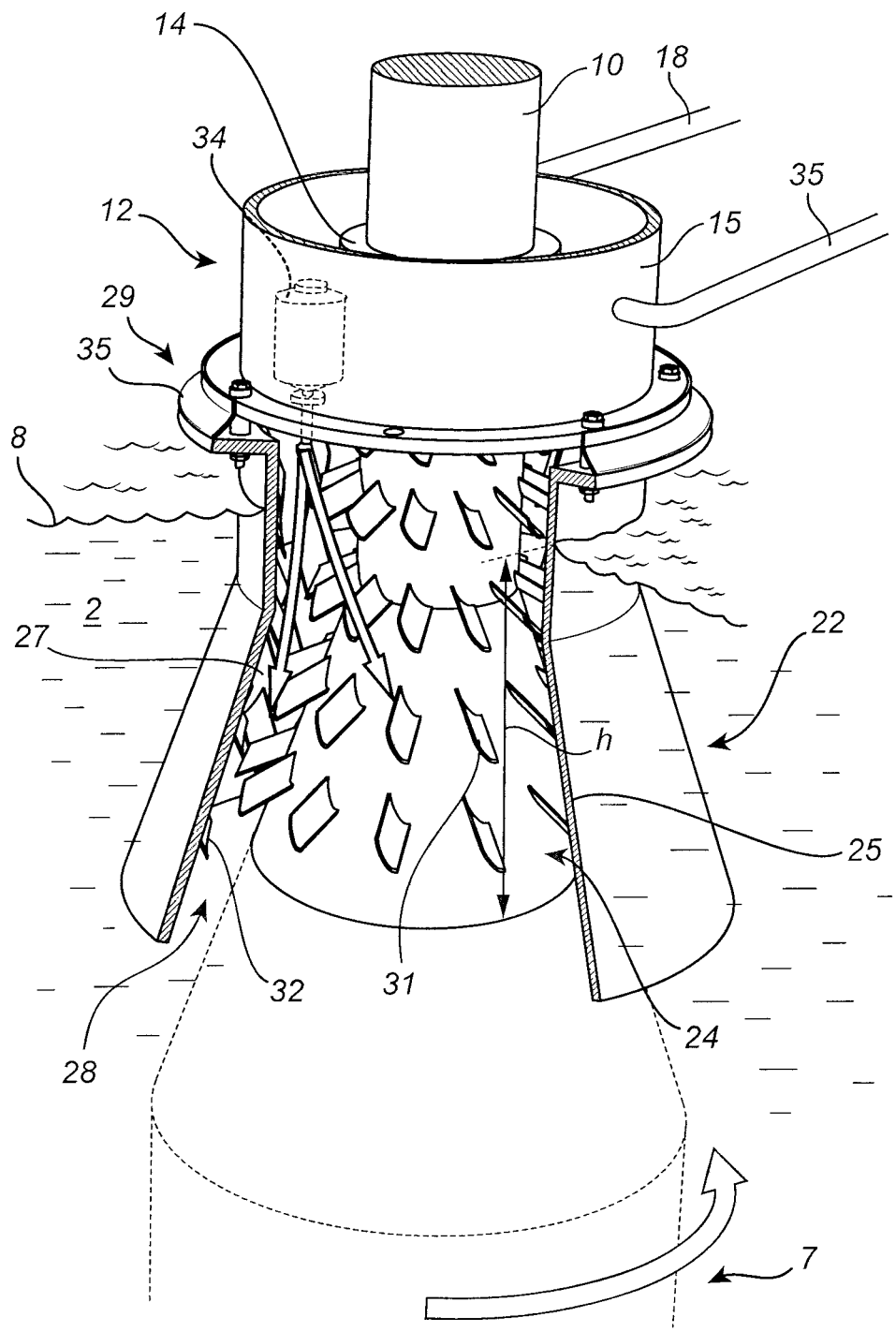
FIG. 2a is an enlarged view of the braking arrangement comprised in the wind energy harvesting apparatus in FIG. 1 in its disengaged state.

Referring first to FIG. 2a, in which the braking arrangement is shown in its disengaged or "non-braking" state, the braking arrangement 22 comprises a first water transporting part, here in the form of a water transporting portion 24 of the wind turbine body, and a second water transporting part, in the form of concentric shell 25. As is schematically indicated in FIG. 2a, the concentric shell 25 is attached to the anchoring arrangement 17 (in FIG. 1) via the second energy converter part 15 and the arm 18, and is thus kept stationary in relation to the water transporting portion 24 of the wind turbine body.

As is schematically shown in FIG. 2a, the concentric shell 25 is arranged in relation to the water transporting portion 24 in such a way as to form a water transport path 27 from an inlet 28 below the water surface 8 to an outlet 29 above the water surface 8.

In the illustration in FIG. 2a, the concentric shell has been partly opened to show that the water transporting portion 24 is provided with blades 31 for transporting water that is in contact with the blades 31 upward along the water transport path 27. To make this transporting of water more efficient, the interior of the concentric shell 25 is provided with blades 32 arranged to co-operate with the blades 31 of the water transporting portion in directing the water upwards towards the outlet 29.

Additionally, the braking arrangement 22 in FIG. 2a comprises an access control arrangement for controllably preventing water from passing through the water transporting arrangement, from the inlet 28 to the outlet 29. The access control arrangement comprises, referring to FIG. 2a, a compressor 34 arranged and configured to provide pressurized air to the water transport path 27, and a sealing arrangement 35 for restricting a flow of air through the outlet 29. The compressor is attached to the second energy converter part 15, is powered by the energy converter 12, and is controlled by a controller (not shown in FIG. 2a). Input to the controller for control of the compressor 34 may, for example, come from a pressure sensor (not shown) sensing a pressure in the water transport path 27 and/or from a control interface allowing external control of the operation of the braking arrangement 22.

The blades 31 for transporting water are arranged at a distance h below the water surface 8. By controlling the compressor 34 to maintain a pressure $P_0$ that is somewhat higher than the pressure corresponding to a water column with the same height h, water will be prevented from reaching the blades 31, which therefore rotate freely in air. The sealing arrangement 35, which may be provided in the form of a rubber neck as shown in FIG. 2a, should be dimensioned to allow the compressor 34 to maintain the needed disengagement pressure $P_0$ with limited leakage of air through the sealing arrangement 35.

Moreover, the sealing arrangement 35 should also be dimensioned to give way to transported water and open up the outlet 29 when the braking arrangement 22 is engaged.

Figure 2B:
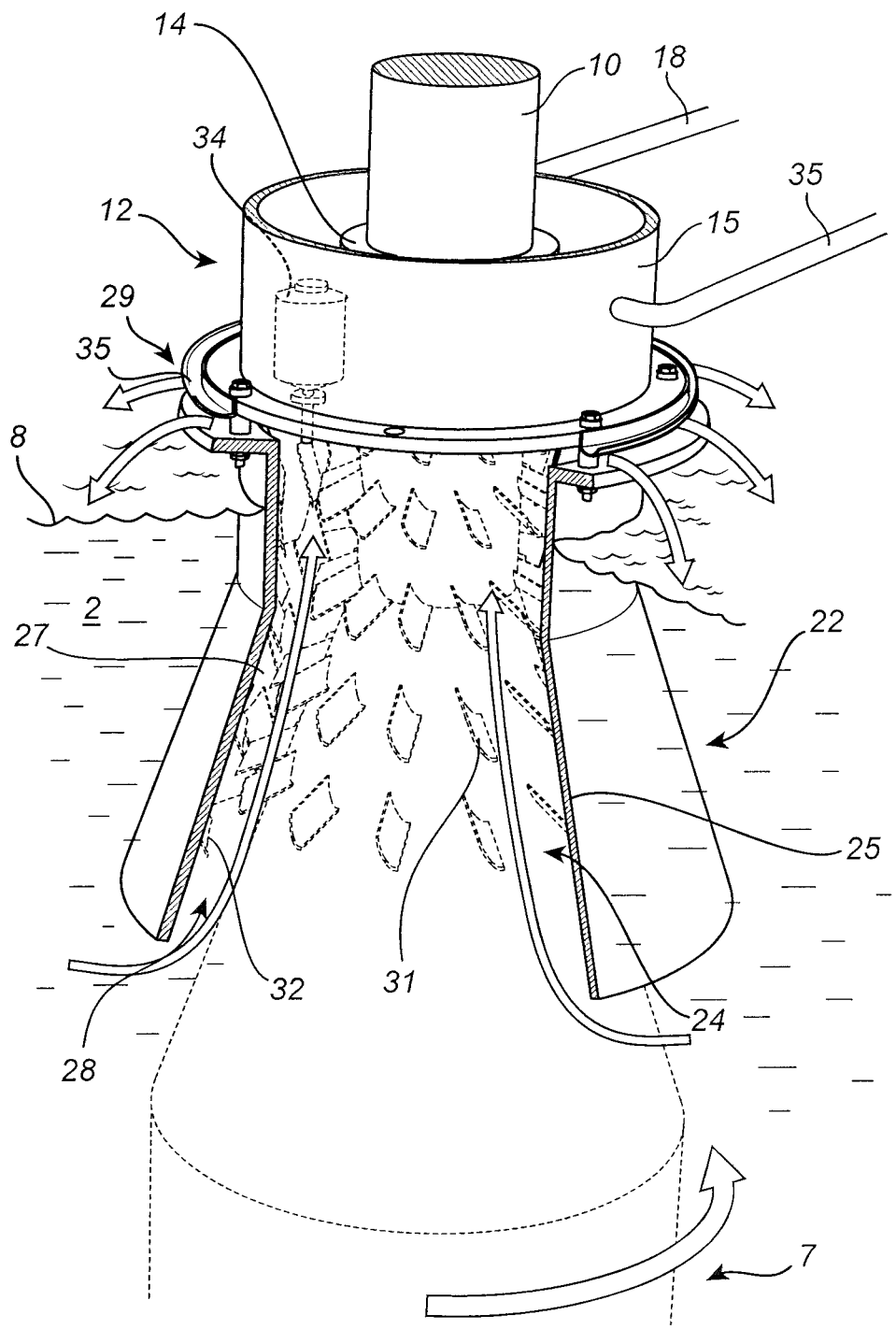
FIG. 2b is an enlarged view of the braking arrangement comprised in the wind energy harvesting apparatus in FIG. 1 in its engaged state.

This situation is schematically shown in FIG. 2b. Referring to FIG. 2b, the compressor 34 has been stopped, either by the controller or through an interruption in the supply of electrical energy to the compressor 34.

As a result of leakage of pressurized air through the sealing arrangement 35, the water will almost immediately enter through the inlet 28 and reach the blades 31 of the water transporting portion 24 of the wind turbine body. When this happens, the water is caught by the blades 31 and transported by the blades 31, in co-operation with the blades 32 on the concentric shell 25, through the water transport path 27 towards the outlet 29. When the water hits the sealing 35, the sealing is forced open by the much higher pressure exerted by the water and water flows out through the outlet 29.

Hereby, energy in the form of rotation of the wind turbine is partly converted to kinetic and potential energy of the transported water, resulting in a braking of the wind turbine. The braking is very efficient, especially at high rotational speeds resulting in a high flow rate of water from the inlet 28 to the outlet 29. Furthermore, braking will, in practice, not result in any temperature increase of any parts of the floating wind energy harvesting apparatus.

Figure 3:
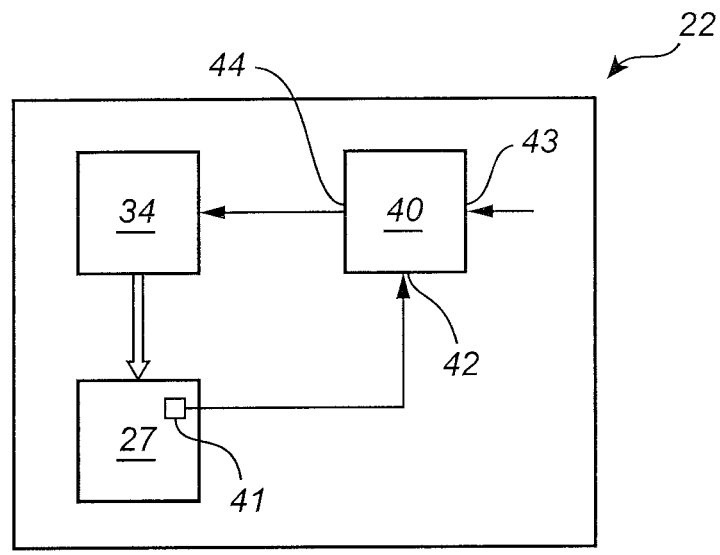
FIG. 3 is a schematic block diagram of the braking arrangement in FIGS. 2a-b.

A simple block diagram illustrating the functional relations between the active components of the braking arrangement 22 is provided in FIG. 3.

Referring to FIG. 3, the braking arrangement 22 comprises the above-mentioned compressor 34, a controller 40 and a pressure sensor 41. The controller has a first input 42 for receiving a signal indicating the pressure in the water transport path 27 (schematically indicated as a box in FIG. 3) from the pressure sensor 41, a second input 43 for receiving an external control signal, and an output 44 connected to the compressor 34 for controlling operation of the compressor 34.

Figure 4:
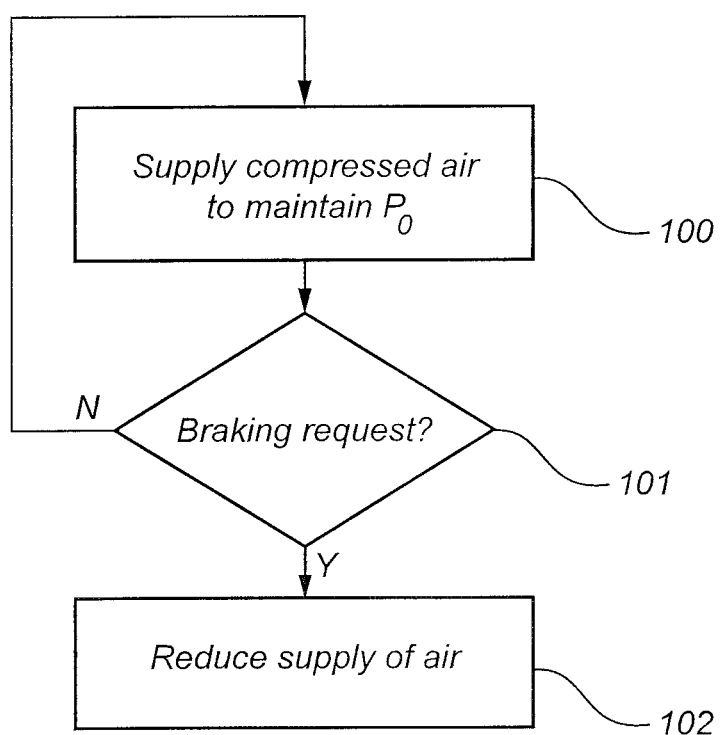
FIG. 4 is a flow-chart schematically illustrating an example embodiment of the method according to the present invention.

Having now described an example embodiment of the floating wind energy harvesting apparatus according to the present invention, a braking method according to an embodiment of the present invention will be described below with reference to the flow-chart in FIG. 4 and continued reference to FIG. 1, FIG. 2, and FIG. 3 where applicable.

In a first step 100, the compressor 34 is controlled by the controller 40 to supply compressed air to the space between the water transporting portion 24 of the wind turbine body and the concentric shell 25 to maintain the pressure above the disengaging pressure $P_0$ at which the water level inside the water transporting arrangement 22 is kept below the blades 31 of the water transporting portion 24.

In the next step 101, it is monitored, by the controller 40, if a breaking request is received through the second input 43 of the controller 40. If this is not the case, the method returns to step 100 and the pressure is maintained above $P_0$.

If, on the other hand, it is determined in step 101 that a breaking request has been received, the controller 40 controls the compressor 34 to reduce the pressure in the water transport path 27 to a level below $P_0$ so that the water can rise to come into contact with the blades 31 of the water transporting portion 24 of the wind turbine body, which will result in a braking of the VAWT 1 as described above.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A floating wind energy harvesting apparatus for offshore installation, said wind energy harvesting apparatus comprising:
   an elongated wind turbine body extending along a longitudinal wind turbine body axis;
   at least one blade attached to the wind turbine body for converting wind energy to rotation of the wind turbine body around the longitudinal wind turbine body axis;
   an energy converter coupled to said wind turbine body for converting the rotation of said wind turbine body to electrical energy; and
   a braking arrangement for controllably reducing a rotational speed of said wind turbine body, said braking arrangement comprising:
   an inlet;
   an outlet;
   a water transporting arrangement coupled to said wind turbine body and configured to use kinetic energy of the rotation of the wind turbine body around the longitudinal wind turbine body axis to transport water from said inlet to said outlet; and
   an access control arrangement for controllably preventing water from passing through said water transporting arrangement.

2. The floating wind energy harvesting apparatus according to claim 1, wherein said water transporting arrangement comprises:
- a first water transporting part rotating in response to rotation of said wind turbine body; and
- a second water transporting part to be kept relatively stationary in relation to said wind turbine body,
- wherein said second water transporting part is arranged to form a water transport path from said inlet to said outlet between said wind turbine body and said second water transporting part; and
- wherein said first water transporting part comprises a water moving member for moving water through said water transport path when said first water transporting part rotates in relation to said second water transporting part.

3. The floating wind energy harvesting apparatus according to claim 2, wherein said first water transporting part is constituted by a portion of said wind turbine body.

4. The floating wind energy harvesting apparatus according to claim 2, wherein said second water transporting part is arranged concentrically around said wind turbine body.

5. The floating wind energy harvesting apparatus according to claim 2, wherein said water moving member is constituted by at least one blade for pushing water along said water transport path.

6. The floating wind energy harvesting apparatus according to claim 2, wherein said second water transporting part comprises at least one water redirecting member for co-operating with the water moving member comprised in said first water transporting part.

7. The floating wind energy harvesting apparatus according to claim 1, wherein said access control arrangement is controllable to prevent water from reaching said water transporting arrangement through said inlet.

8. The floating wind energy harvesting apparatus according to claim 7, wherein said access control arrangement comprises a gas supply arrangement for providing pressurized gas to a space formed between said inlet and said outlet.

9. The floating wind energy harvesting apparatus according to claim 8, wherein said gas supply arrangement comprises a compressor powered by said energy converter.

10. The floating wind energy harvesting apparatus according to claim 8, wherein said access control arrangement further comprises a sealing arrangement for restricting a flow of said gas through said outlet.

11. The floating wind energy harvesting apparatus according to claim 1, wherein said water transporting arrangement comprises:
- a first water transporting part formed by a portion of said wind turbine body and a plurality of water moving blades attached to said wind turbine body; and
- a second water transporting part formed by a concentrically arranged shell surrounding said first water transporting part to form a water transport path between said inlet at a lower opening between said first water transporting part and said second water transporting part and said outlet at an upper opening between said first water transporting part and said second water transporting part; and wherein said access control arrangement comprises:
- a compressor powered by said energy converter for providing pressurized air into said water transport path; and
- a sealing arrangement arranged to restrict flow of said air through said outlet, thereby allowing said pressurized air to prevent water from reaching said water moving blades.

12. The floating wind energy harvesting apparatus according to claim 1, wherein said wind turbine body comprises a lower body portion to be below a water surface when the wind energy harvesting apparatus is in operation and an upper body portion to be above the water surface when the wind energy harvesting apparatus is in operation; and
- said energy converter comprises a first energy converter part coupled to said turbine body for rotating in response to rotation of said wind turbine body, and a second energy converter part to be kept relatively stationary in relation to said wind turbine body, the resulting rotation of said first energy converter part in relation to said second energy converter part being converted to electrical energy by said energy converter,
- wherein said energy converter is attached to said wind turbine body by means of a first releasable mechanical coupling between said first energy converter part and said lower body portion of the wind turbine body, and a second releasable mechanical coupling between said first energy converter part and said upper body portion of the wind turbine body.

13. A method of controlling a rotational speed of a wind energy harvesting apparatus floating in a body of water, said wind energy harvesting apparatus comprising:
- an elongated wind turbine body extending along a longitudinal wind turbine body axis to be partly below a surface of said body of water;
- at least one blade attached to said wind turbine body for converting wind energy to rotation of the wind turbine body around the longitudinal wind turbine body axis; and
- an energy converter coupled to said wind turbine body for converting the rotation of said wind turbine body to electrical energy, wherein said method comprises the steps of:
- providing a braking arrangement comprising an inlet, an outlet, and a water moving member coupled to said wind turbine body for converting kinetic energy of the rotation of the wind turbine body around the longitudinal wind turbine body axis to movement of water that is in contact with said water moving member from said inlet to said outlet; and
- controlling access of water from said body of water to said water moving member.

14. The method according to claim 13, wherein said step of controlling access comprises the steps of:
- supplying compressed air to a water transport path between said inlet and said outlet to prevent water from said body of water from reaching said water moving member;
- acquiring a signal indicating that a reduced rotational speed of said wind turbine body is desired; and
- reducing the supply of compressed air to said water transport path to thereby allow water from said body of water to reach said water moving member.

* * * * *